United States Patent
Kapre et al.

(10) Patent No.: US 10,429,485 B1
(45) Date of Patent: Oct. 1, 2019

(54) SYSTEMS, DEVICES AND METHODS FOR LOCATION IDENTIFICATION AND REPORTING USING RADIO FREQUENCY

(71) Applicant: Vacus Tech Private Limited, Bangalore, Karnataka (IN)

(72) Inventors: Venugopal Kapre, Karnataka (IN); Gururaj Kanade, Karnataka (IN)

(73) Assignee: VACUS TECH PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/003,048

(22) Filed: Jun. 7, 2018

(51) Int. Cl.
*G01S 5/02* (2010.01)
*G01S 5/14* (2006.01)
*H04W 64/00* (2009.01)

(52) U.S. Cl.
CPC .............. *G01S 5/0215* (2013.01); *G01S 5/14* (2013.01); *H04W 64/003* (2013.01)

(58) Field of Classification Search
CPC ....... G01S 5/0215; G01S 5/14; H04W 64/003
USPC .............................................. 455/456.1–457
See application file for complete search history.

(56) References Cited

U.S. PATENT DOCUMENTS

| | | | | |
|---|---|---|---|---|
| 5,872,548 A | * | 2/1999 | Lopez | H01Q 21/28 343/890 |
| 6,097,708 A | * | 8/2000 | Mao | H04W 16/02 370/329 |
| 2010/0238862 A1 | * | 9/2010 | Davidson | H04W 4/029 370/328 |
| 2015/0296476 A1 | * | 10/2015 | Wilmhoff | H04W 64/00 455/456.1 |
| 2016/0295355 A1 | * | 10/2016 | Yuan | H04W 36/06 |
| 2017/0237673 A1 | * | 8/2017 | Law | H04L 47/25 370/338 |

* cited by examiner

*Primary Examiner* — Michael Y Mapa
(74) *Attorney, Agent, or Firm* — One LLP; Joseph K. Liu

(57) ABSTRACT

Provided are systems, devices and methods for determining a spatial location of a target radio frequency node/nodes of a first type, located in a defined space. The system includes a plurality of radio frequency nodes of a second type also located within the defined space and communicate with the target radio frequency node. A radio frequency node of a third type located within/outside the defined space communicates with the plurality of radio frequency nodes of the second type to determine the spatial location of the target radio frequency node.

13 Claims, 23 Drawing Sheets

(All dimensions are in mm)

SYSTEMS, DEVICES AND METHODS FOR LOCATION IDENTIFICATION AND REPORTING USING RADIO FREQUENCY

FIELD OF THE INVENTION

The present disclosure relates generally to the field of location identification, and more particularly to systems, devices and methods for accurately determining the spatial location of a given radio frequency node in a given space.

BACKGROUND OF THE INVENTION

A wireless spatial position or location identification system is generally defined as a system to identify the geometrical co-ordinates of a target in a given plane. The current radio frequency based wireless positioning systems suffer inaccuracies due to errors introduced by the inherent behavior of the radio frequency (RF) waves, limitations of the approaches, techniques, and methods employed to identify the geometrical co-ordinates. Multipath fading is one such critical impacting phenomenon that is a cause of such inaccuracies. In addition, an RF wireless channel potentially can undergo, to name just a few:

(1) Slow fading due to increase in distance between the transmitter and receiver.

(2) Fast fading due to presence of multipath.

(3) Co-channel interference due to presence of other (undesirable) RF transmission signal in the same channel.

(4) Adjacent channel interference due to presence of other (undesirable) RF transmission signal in an adjacent channel.

Although current wireless positioning systems use various approaches, techniques, and methods to overcome the above challenges, they have not been able to provide any satisfactory solution.

A need therefore exists to develop systems, devices and methods for accurately determining the spatial location of a given radio frequency node in a given space without the above mentioned and other disadvantages.

SUMMARY OF THE INVENTION

Provided herein are example embodiments of systems, devices and methods for accurately determining the spatial location of a given radio frequency node in a given space. Generally, a set of devices may be arranged such that systems, devices and methods of the present disclosure may determine the location or position of an RF node within a defined space. As used herein, location and position may be used interchangeably.

In some embodiments, systems, devices and methods are provided for determining a spatial location of one or more target radio frequency nodes of a first type, located in a defined space. The system may include a plurality of radio frequency nodes of a second type also located within the defined space and communicate with the target radio frequency node/nodes. A radio frequency node of a third type, which may be located inside or outside the defined space, communicates with the plurality of radio frequency nodes of the second type to determine the spatial location of the target radio frequency node/nodes of first type.

In some embodiments, the target radio frequency node may include an omni-directional antenna, each of the plurality of radio frequency nodes of the second type may include a multi-antenna system and an antenna switch controlling the operational status of the antennas of the multi-antenna system. The antennas of the multi-antenna system may be arranged in spatial sectors having an angular separation of 45 degrees at a 20 mm distance apart to create a discrete directional antenna set, and sub-sectors of angular width of 22.5 degrees. Each antenna of the multi-antenna system may provide radio radiation coverage in a specific direction and in a predetermined angular sector of the defined space. The spatial location of the target radio frequency node is computed/, by the radio frequency node of the third type, from the angular sub-sector data obtained from the plurality of radio frequency nodes of the second type.

These embodiments and others described herein are improvements in the fields of spatial location determination. Other systems, devices, methods, features and advantages of the subject matter described herein will be apparent to one with skill in the art upon examination of the following figures and detailed description. The various configurations of these devices are described by way of the embodiments which are only examples. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

FIGS. 1-19 illustrate exemplary embodiments of systems, devices and methods for accurately determining the spatial location of a given radio frequency node in a given space. Generally, the present system may include one or more devices of a first type, these devices will be referred to herein as Node Type A device, Node A device, node Type A, or Node A; one or more devices of a second type, these devices will be referred to herein as Node Type B device, Node B device, node Type B, or Node B; and one or more devices of a third type, these devices will be referred to herein as Node Type C device, Node C device, node Type C, or Node C. In some embodiments, these devices may be arranged in relation to one another and to a geographic area so that the geometric coordinates of one or more Node Type A devices can be determined.

The embodiments of the present disclosure provide for improvements that can include, for example, optimization of computer resources, improved data accuracy and improved data integrity, to name only a few.

To ensure the integrity of the data, several data validation methods may also be provided. For example, antenna signal data may be checked and validated before being used in further computation.

Figure 1:
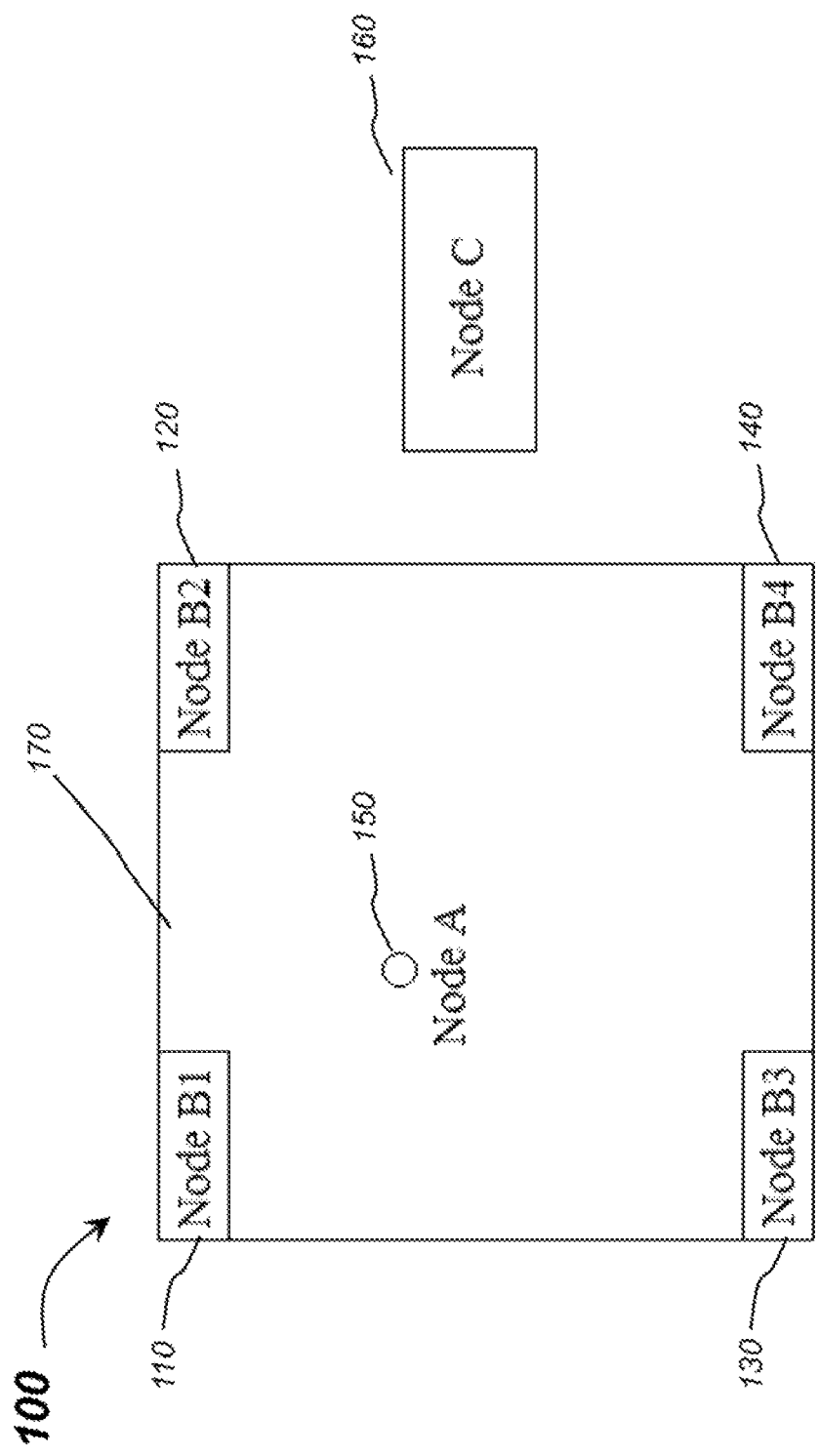
FIG. 1 illustrates an exemplary diagram of a system for accurately determining the spatial location of a given radio frequency node in a given space, according to an embodiment of the disclosure.

Turning to FIG. 1, an exemplary diagram of a system 100 for accurately determining the spatial location of a given radio frequency node in a given space is illustrated, according to some embodiments of the present disclosure. In one aspect of some embodiments, system 100 may include a plurality of Nodes B 110, 120, 130, 140, a Node A 150 and a Node C 160. FIG. 1 illustrates an exemplary arrangement of the locations for Nodes B 110, 120, 130, 140, Node A 150 and Node C 160. For example, Node A 150 may be located within a space/area 170, Nodes B 110, 120, 130, 140 may be advantageously located on the periphery of the space/area 170, and Node C may be located outside the space/area 170. Although such advantageous arrangement is used, a person skilled in the art will understand that other arrangements may be contemplated. an objective may be to determine the geometric coordinates of Node A along the X axis and Y axis in order to specify its location within the configured area 170.

Although the example in FIG. 1, and in other Figures, depicts one Node A located inside the space/area 170, it should be noted that the systems and methods of the present disclosure can also be used to determine the spatial location of a Node A located outside the space/area 170, or can be used to determine the spatial locations of a plurality of Nodes A located inside or outside the space/area 170.

In some embodiments, a Node B 110, 120, 130, 140 may include a housing that houses one or more processors, one or more antennas and a wireless radio frequency radio. Node B may also include a circuit by which the antennas may be connected to the processor via one or more radio frequency channel switches. The radio frequency radio can wirelessly broadcast signal/beacon provided by the processor at defined interval. The radio frequency radio can also wirelessly receive signal/beacon and send it to the processor for processing. Node B may include a main power supply and a suitable battery unit (or units) to power the processor and the wireless RF radio. Node B may also include a non-transitory medium, e.g., a memory, to store methods and procedures in the form of executable code, or computer programs, embodying one or more embodiments of the present disclosure, which when executed by the processor may compute data and perform the steps of the methods and procedures. Node B may also include one or more wired or wireless network communication interfaces.

In some embodiments, a Node A 150 may include a housing that houses one or more processors, one or more antennas and a wireless radio frequency radio. The antenna may directly interface with the processor through a radio frequency radio transceiver. The wireless radio can broadcast a signal/beacon provided by the processor at defined interval. Node A may include a suitable battery unit (or units) to power the processor and the wireless radio. Node A may also include a non-transitory medium, e.g., a memory, to store methods and procedures in the form of executable code, or computer programs, embodying one or more embodiments of the present disclosure, which when executed by the processor may compute data and perform the steps of the methods and procedures. Node A may also include one or more wired or wireless network communication interfaces.

In some embodiments, Node C 160 may include a housing that houses one or more processors, one or more antennas and one or more wired or wireless network communication interfaces. The antenna may be omni-directional or a suitable type of antenna as per communication requirement. The communication interface is used to transmit to and receive data from the Nodes B, as well as to and from the internet or other network. Node C may include a main power supply and a suitable battery unit (or units) to power the processor and the wireless radio. Node C may also include a non-transitory medium, e.g., a memory, to store methods and procedures in the form of executable code, or computer programs, embodying one or more embodiments of the present disclosure, which when executed by the processor may compute data (e.g., received from Nodes B) and perform the steps of the methods and procedures.

Table A below illustrates exemplary functions of the nodes shown in FIG. 1, according to some embodiments of the present disclosure.

TABLE A

| Node Id | Primary function | Functionality implemented as | Arrangement/Position |
|---|---|---|---|
| Node A | Signal Broadcast | A device/apparatus | Within configured area |
| NodeB | Broadcast reception & primary processing Forwarding processed data to Node C | Set of devices/apparatus (Nodes B1, B2, B3 & B4) | Typically on the periphery of the configured area |
| Node C | Data aggregation from Node B (Nodes B1, B2, B3 & B4) & location computation | Single device/apparatus | Inside or outside the configured area |

Figure 2:
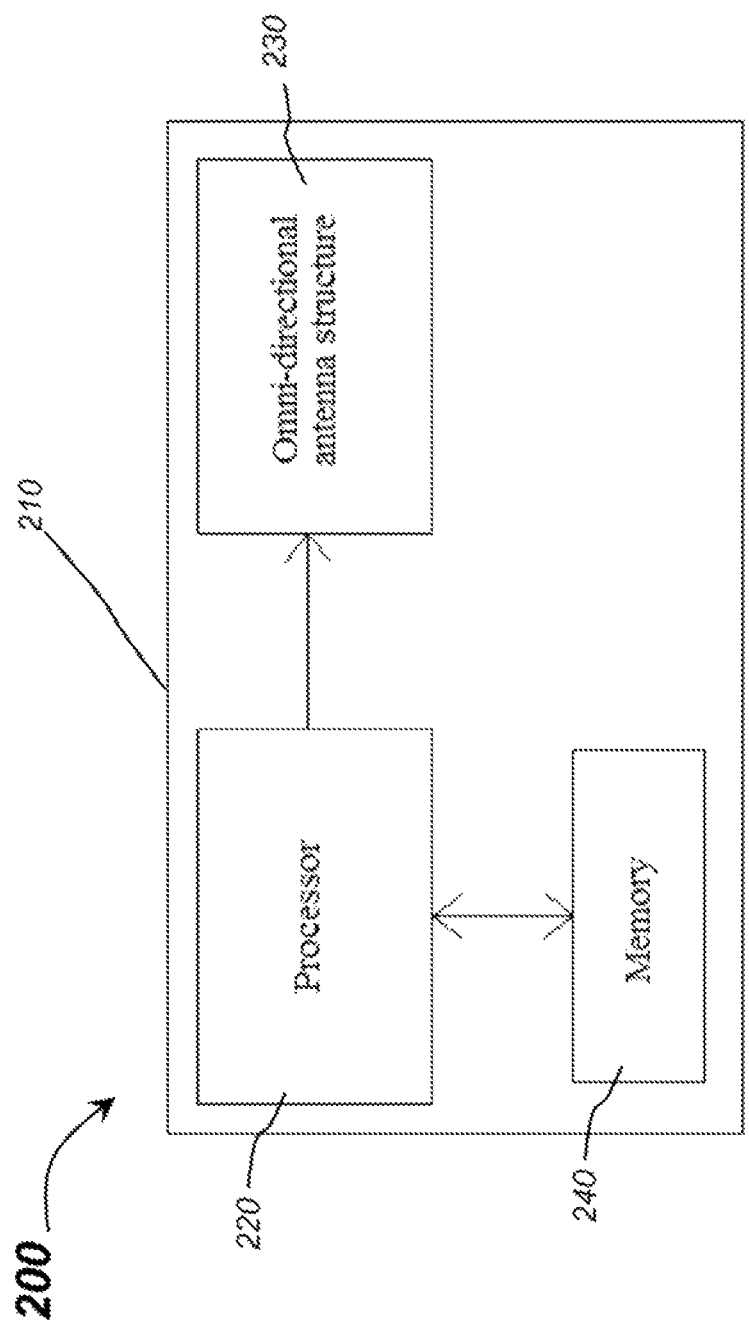
FIG. 2 illustrates an exemplary architecture diagram of a Node A device, according to an embodiment of the disclosure.

Turning to FIG. 2, an exemplary architecture diagram of a Node A device 200 is illustrated, according to some embodiments of the present disclosure. In one aspect of some embodiments, Node A device 200 may include a housing 210 which houses, among others, processor 220, an omni-directional antenna structure 230, and memory unit 240. Node A may be a radio frequency node, designed to transmit a (beacon) broadcast signal periodically to announce its presence and a predefined identity. In one exemplary aspect of some implementations, the periodic interval may be 10 seconds, and the identity may include a 6-byte identification (e.g., 5A-C2-15-A1-00-03). In some embodiments, it transmits/broadcasts a signal/beacon at a programmable interval in ISM band (2.4 GHz-2.48 GHz). The industrial, scientific, and medical radio band (ISM band) refers to a group of radio bands or parts of the radio spectrum that are internationally reserved for the use of radio frequency energy intended for scientific, medical and industrial requirements rather than for communications. ISM bands are also called unlicensed bands. In one exemplary aspect of some implementations, Node A may have a data rate of 250 Kbps, channel bandwidth of 540 KHz and minimum shift keying (MSK) modulation scheme. The omni-directional antenna structure may have a bandwidth of 80 MHz. Although these technical specifications provide operational advantages described herein, a person skilled in the art will understand that other technical specifications may be contemplated. In some embodiments, the omni-directional antenna structure may include a single omni-directional antenna. In other embodiments, the omni-directional antenna structure may include a plurality of omni-directional antennas.

Table B below illustrates exemplary design and radiation pattern for Node A antenna, according to some embodiments of the present disclosure.

TABLE B

| Sr. No. | Gain (G) | Phi | Theta |
|---|---|---|---|
| 1 | 0 dB > G > −3.68 dB | 0 Deg-360 Deg | 0 Deg-180 Deg |

Figure 3:
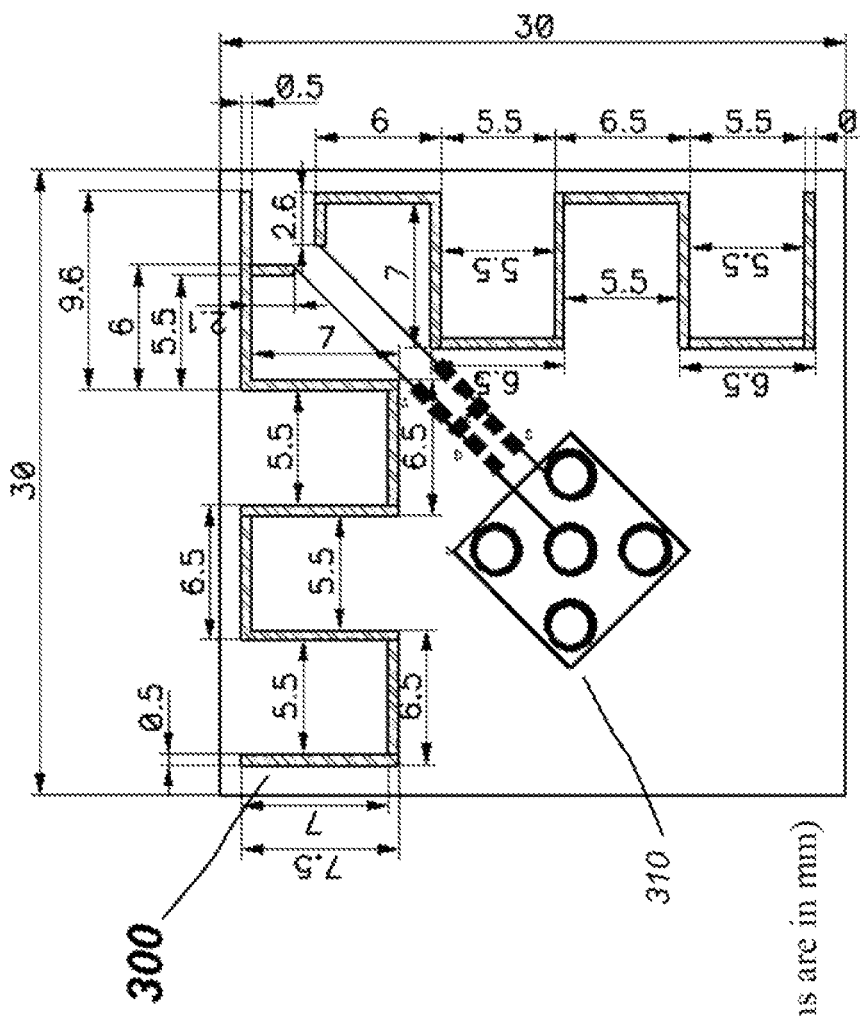
FIG. 3 illustrates an exemplary schematic diagram of a Node A antenna, according to an embodiment of the disclosure.

Turning to FIG. 3, an exemplary schematic diagram of a Node A antenna 300 is illustrated, according to some embodiments of the present disclosure. A connector 310 may connect the antenna 300 to other components (not shown) of Node A. A person skilled in the art will understand that the dimension measurements shown are examples and are not limited, other dimensions may be contemplated.

Figure 4:
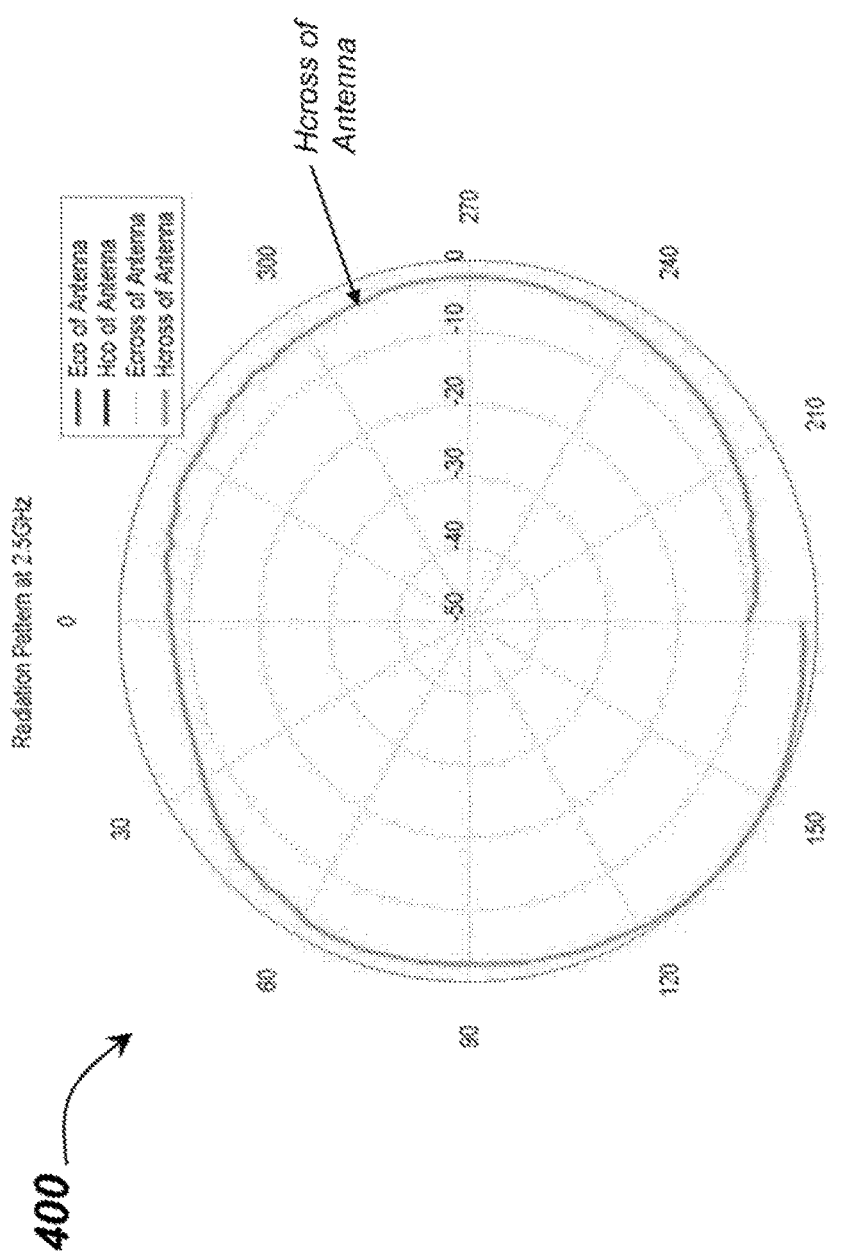
FIG. 4 illustrates an exemplary diagram of an antenna radiation pattern, according to an embodiment of the disclosure.

Turning to FIG. 4, an exemplary diagram of an antenna radiation pattern 400 is illustrated, according to some embodiments of the present disclosure. FIG. 4 shows an exemplary measured E-Plane radiation pattern of a Node A antenna.

Figure 5:
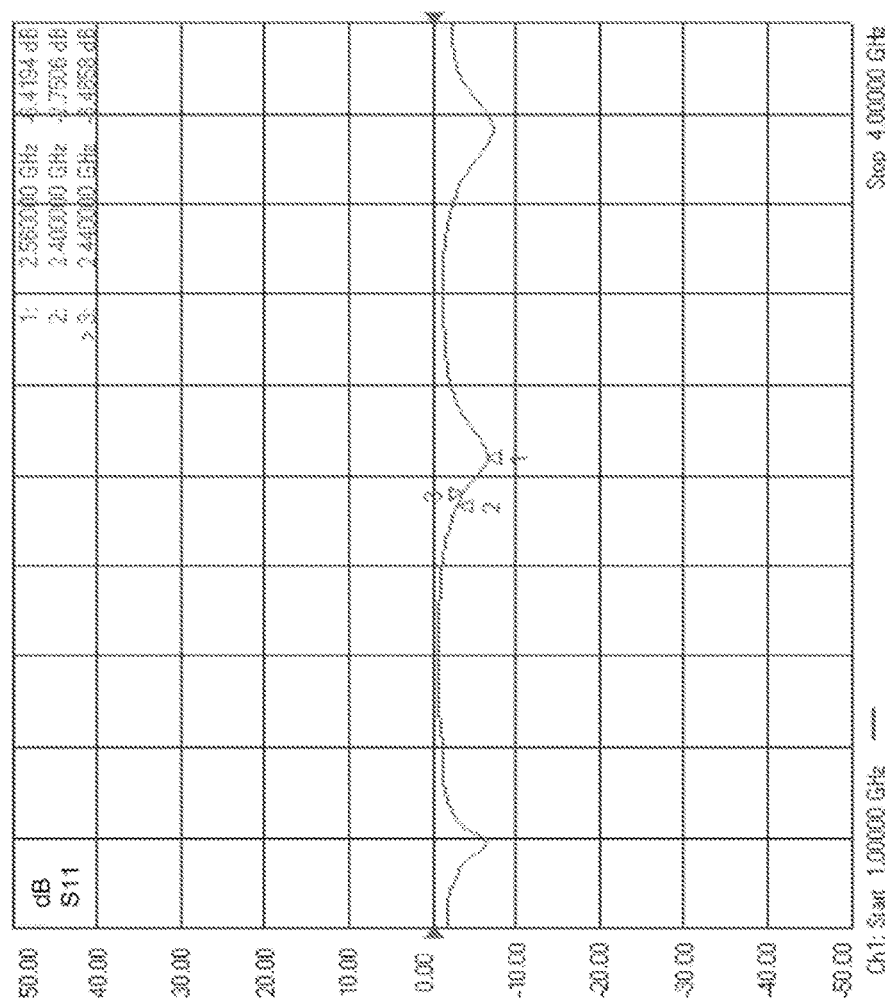
FIG. 5 illustrates an exemplary chart of an S11 measurements of a Node A antenna, according to an embodiment of the disclosure.

Turning to FIG. 5, an exemplary chart 500 of an S11 measurements of a Node A antenna is illustrated, according to some embodiments of the present disclosure. Generally, S11 represents how much power is reflected from the antenna, and hence is known as the reflection coefficient (sometimes written as gamma: Γ) or return loss. As shown, the antenna radiates best at about 2.58 GHz, where S11 is close to −10 dB.

Figure 6:
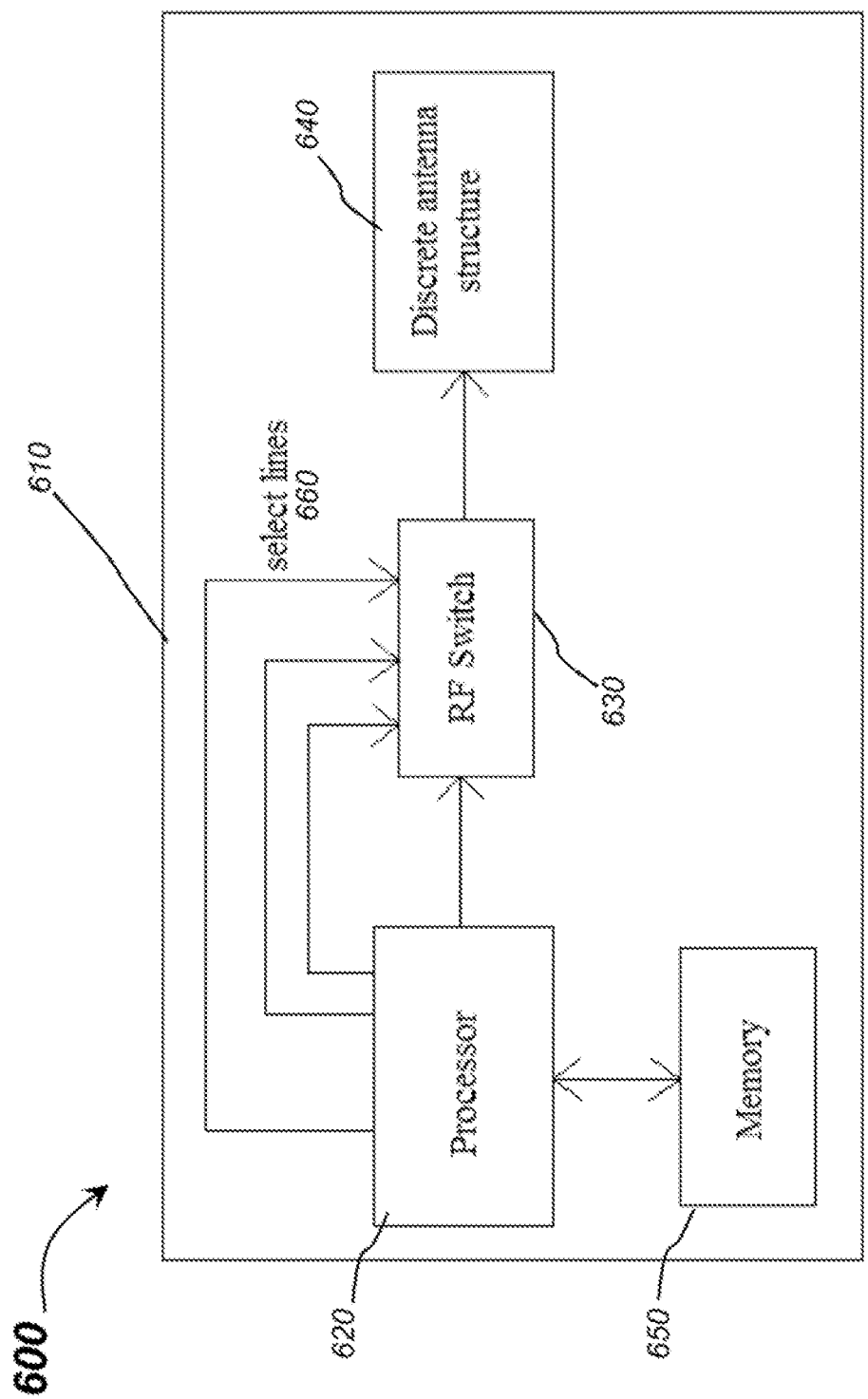
FIG. 6 illustrates an exemplary architecture diagram of a Node B device, according to an embodiment of the disclosure.

Turning to FIG. 6, an exemplary architecture diagram of a Node B device 600 is illustrated, according to some embodiments of the present disclosure. In one aspect of some embodiments, Node B device 600 may include a housing 610 which houses, among others, processor 620, RF switch 630, discrete antenna structure 640, and memory unit 650. Node B may be a radio frequency node, designed to receive and process a (beacon) broadcast signal periodically. In one exemplary aspect of some implementations, the periodic interval may be 10 seconds. In some embodiments, Node B may have multiple discrete directional antenna elements. The RF switch may control the operational status of the antenna elements of the multi-antenna system. Each antenna element may have the same directional radiation characteristics. The radiation characteristics of the antennas may be computed to overcome the effect of a plurality of, e.g., up to 5, strong multipaths using a multiple antenna arrangement. In some embodiments, the antenna systems of Node A and Node B work in conjunction to mitigate the effect of the multipaths (e.g., up to 5 multipaths). In one aspect of some embodiments, the discrete directional antenna elements may have up to 24 in number. In another aspect of some embodiments, these may be arranged in a specific way as described below.

In some embodiments, a plurality of Nodes B (e.g., Nodes B1, B2, B3 and B4 as shown in FIG. 1) form a logical Node B.

Table C below illustrates exemplary design and radiation pattern for Node B antenna, according to some embodiments of the present disclosure.

TABLE C

| Sr. No. | Gain (G) | Phi | Theta |
|---|---|---|---|
| 1 | G = 8 dB | 337.5 Deg-22.5 Deg | 0 Deg-180 Deg |
| 2 | G < 0 dBm | 22.5 Deg-337.5 Deg | 0 Deg-180 Deg |

Figure 7:
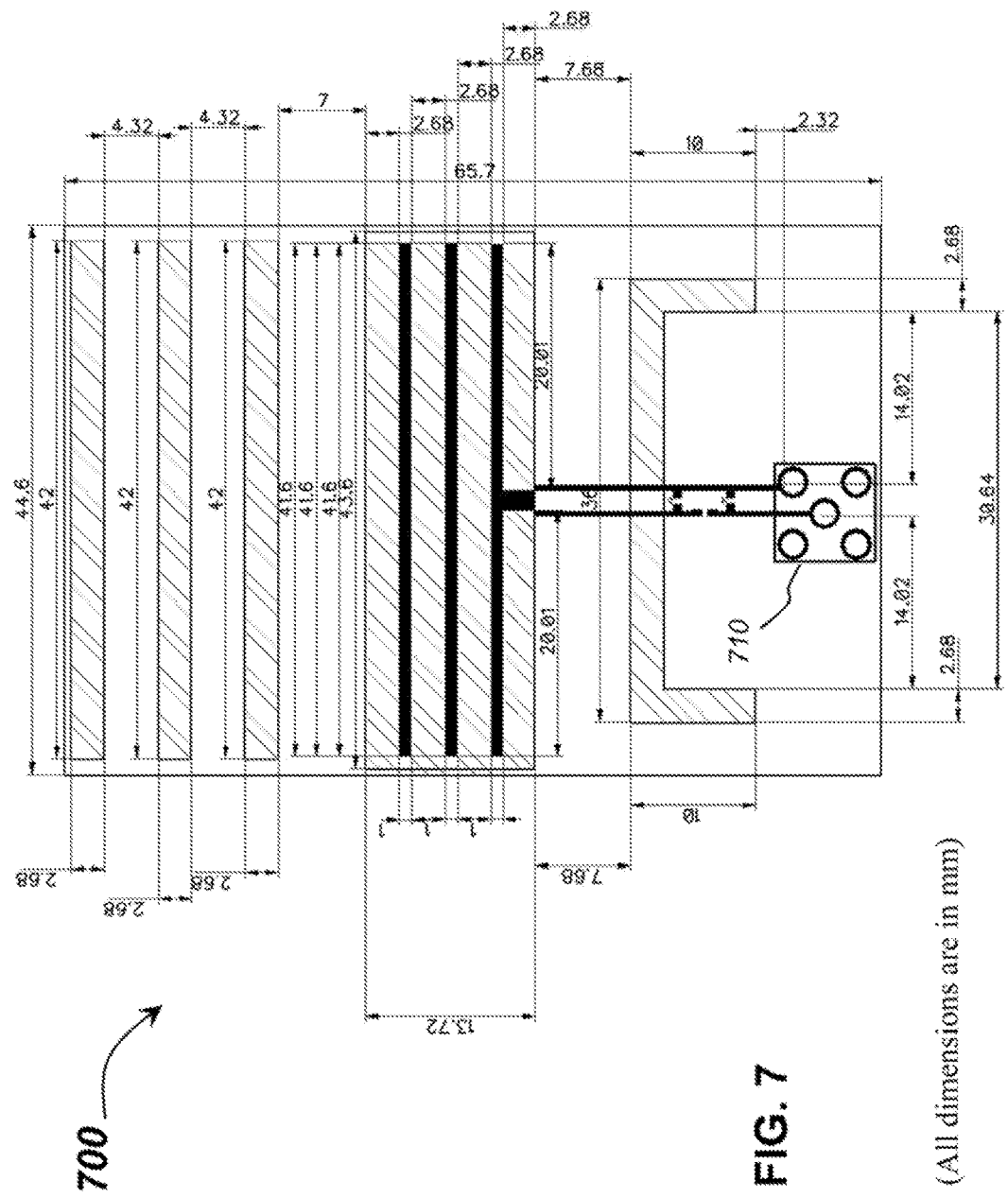
FIG. 7 illustrates an exemplary schematic diagram of a Node B antenna, according to an embodiment of the disclosure.

Turning to FIG. 7, an exemplary schematic diagram of a Node B antenna 700 is illustrated, according to some embodiments of the present disclosure. A connector 710 may connect the antenna 700 to other components (not shown) of Node B. A person skilled in the art will understand that the dimension measurements shown are examples and are not limited, other dimensions may be contemplated.

Figure 8:
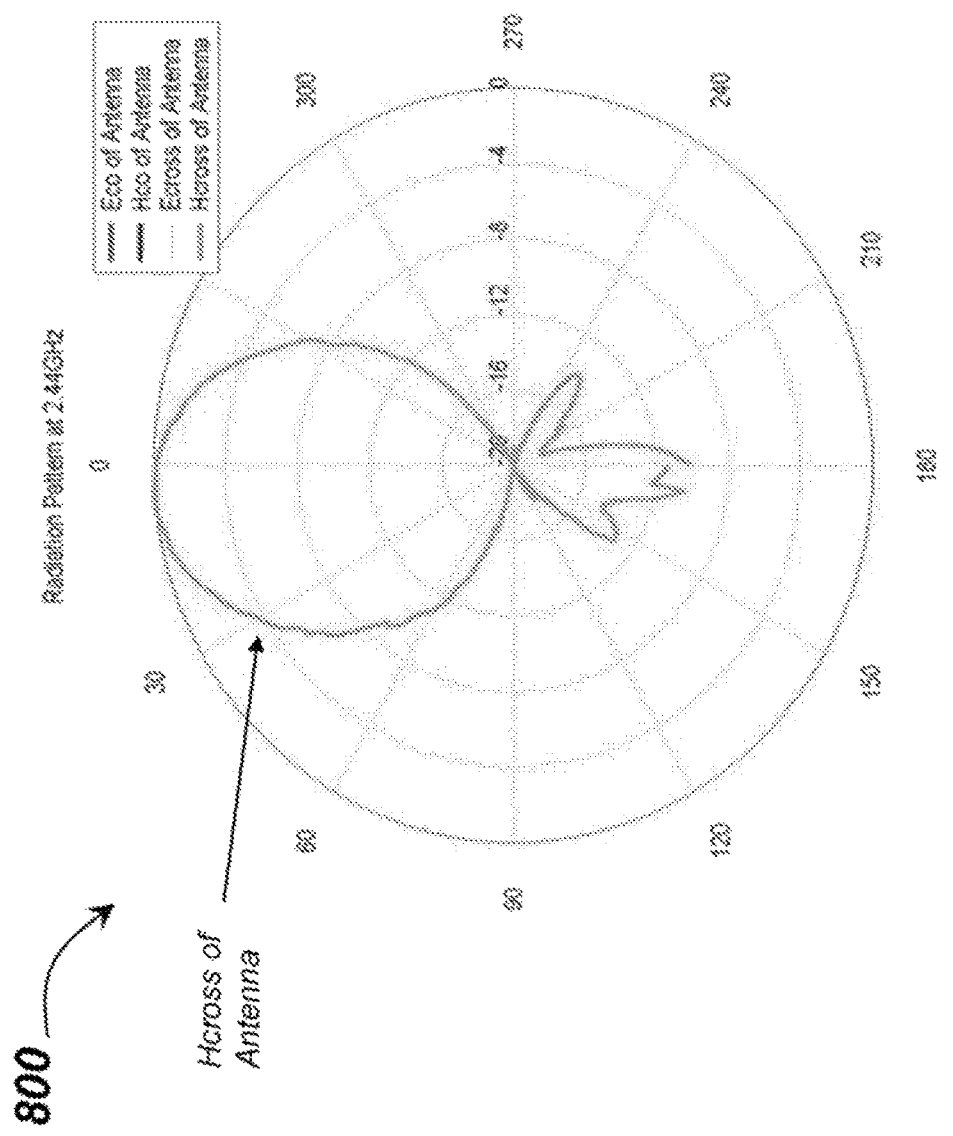
FIG. 8 illustrates an exemplary diagram of an antenna radiation pattern of Node B, according to an embodiment of the disclosure.

Turning to FIG. 8, an exemplary diagram of an antenna radiation pattern 800 is illustrated, according to some embodiments of the present disclosure. FIG. 8 shows an exemplary measured E-Plane radiation pattern of a Node B antenna.

Figure 9:
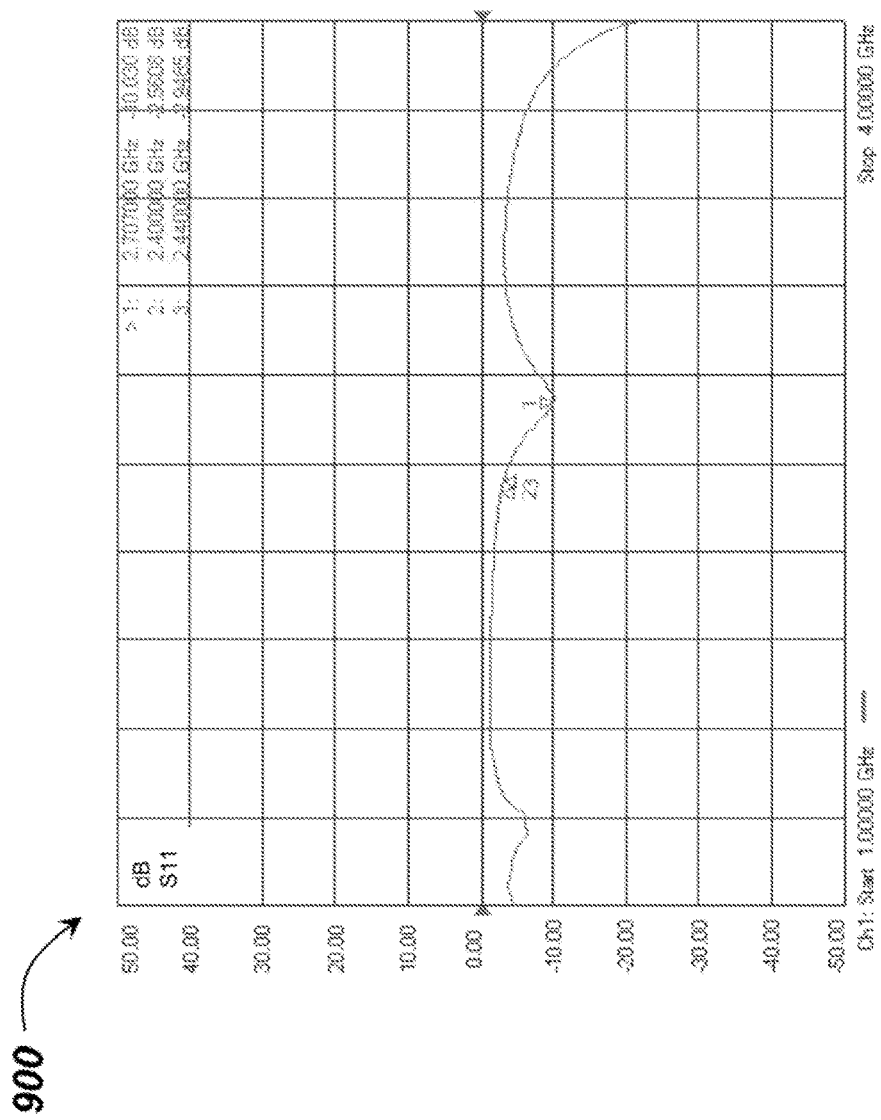
FIG. 9 illustrates an exemplary chart of an S11 measurements a Node B antenna, according to an embodiment of the disclosure.

Turning to FIG. 9, an exemplary chart 900 of an S11 measurements a Node B antenna is illustrated, according to some embodiments of the present disclosure. As shown, the antenna radiates best at about 2.70 GHz, where S11 is close to −10 dB.

Figure 10:
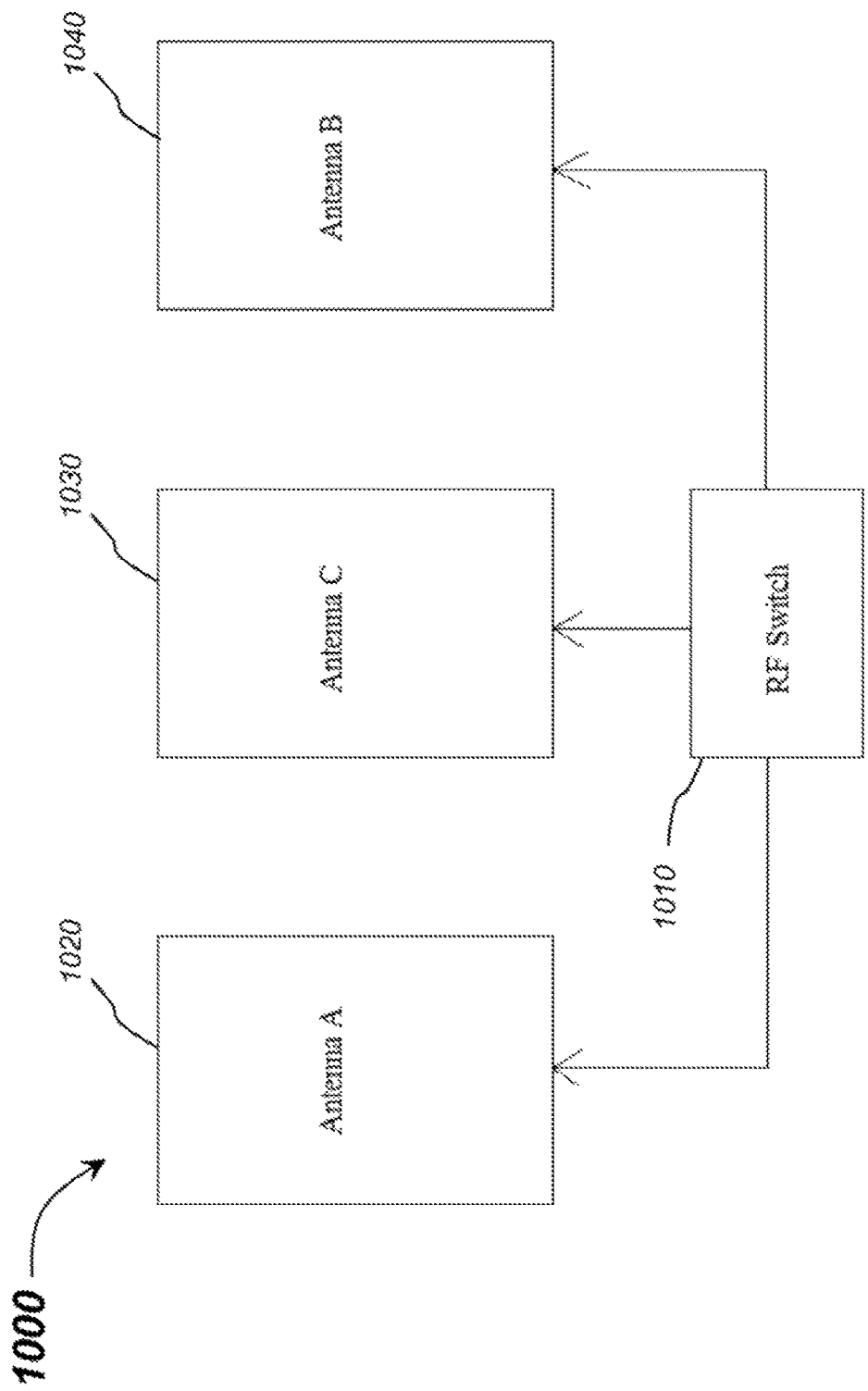
FIG. 10 illustrates an exemplary antenna group arrangement, according to an embodiment of the disclosure.

As mentioned above, Node B may have multiple discrete directional antenna elements. In one aspect of some embodiments, Node B may have in total 24 discrete antennas. These antennas may be segregated in 8 distinct groups with 3 antennas in each group. The antennas within a group may be arranged in an adjacent fashion as depicted in FIG. 10, shown antenna group 1000 having 3 antennas A, B and C (1020, 1030 and 1040). In a given group of 3 antennas, the antenna situated in the center (antenna C) may have maximum priority, and the 2 antennas on each side (antennas A and B) may be used for system correction. Each antenna is coupled to an RF switch 1010.

Figure 11:
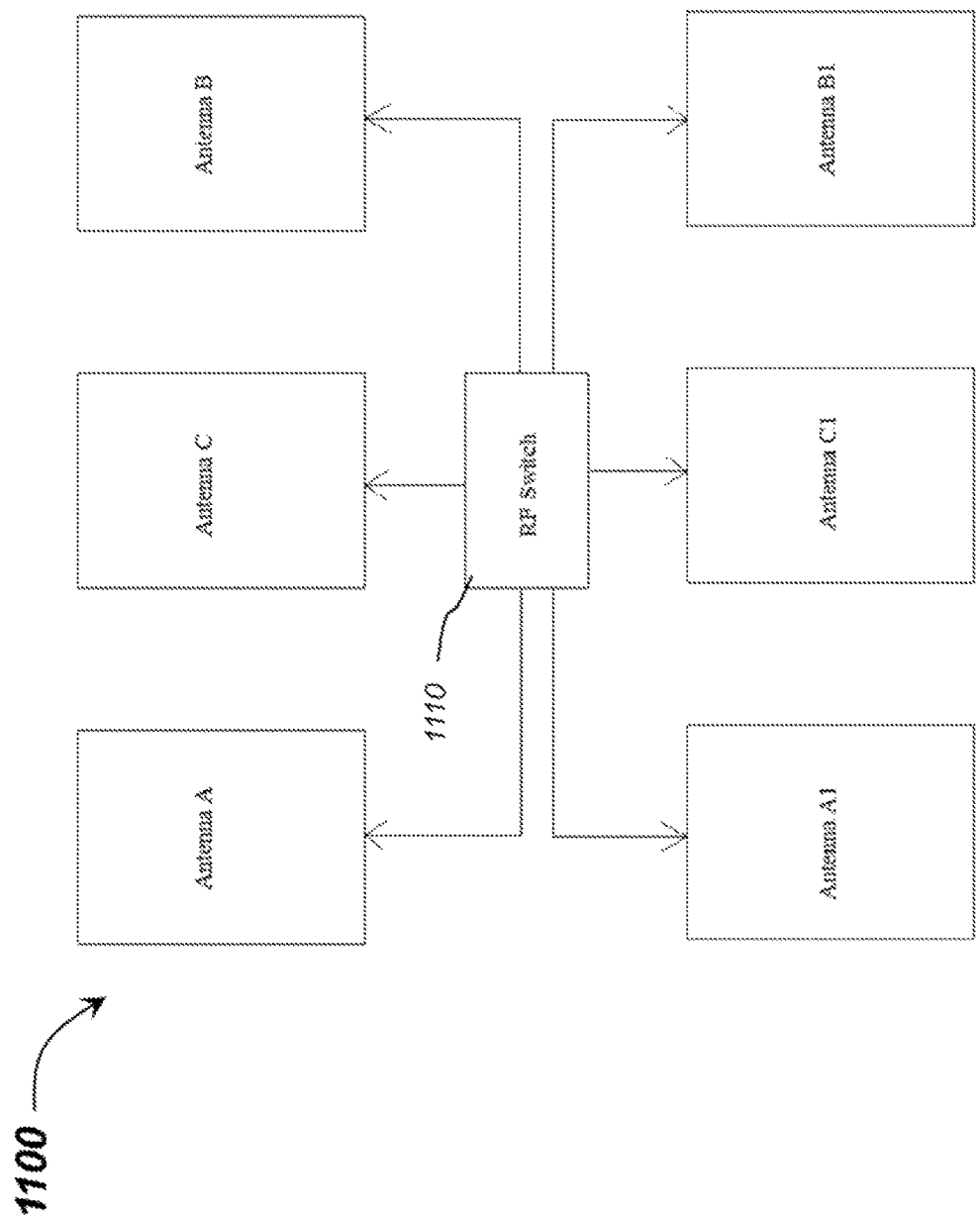
FIG. 11 illustrates an exemplary diagram of a Node B antenna arrangement, according to an embodiment of the disclosure.

Turning to FIG. 11, an exemplary diagram of a Node B antenna arrangement 1100 is illustrated, according to some embodiments of the present disclosure. FIG. 11 shows an exemplary arrangement of two antenna groups having major lobe of RF Radiation facing in opposite directions. One group includes antennas A, B and C. One group includes antennas A1, B1 and C1. Such an arrangement (e.g., of the two groups) is referred here as an Antenna Subset.

Figure 12:
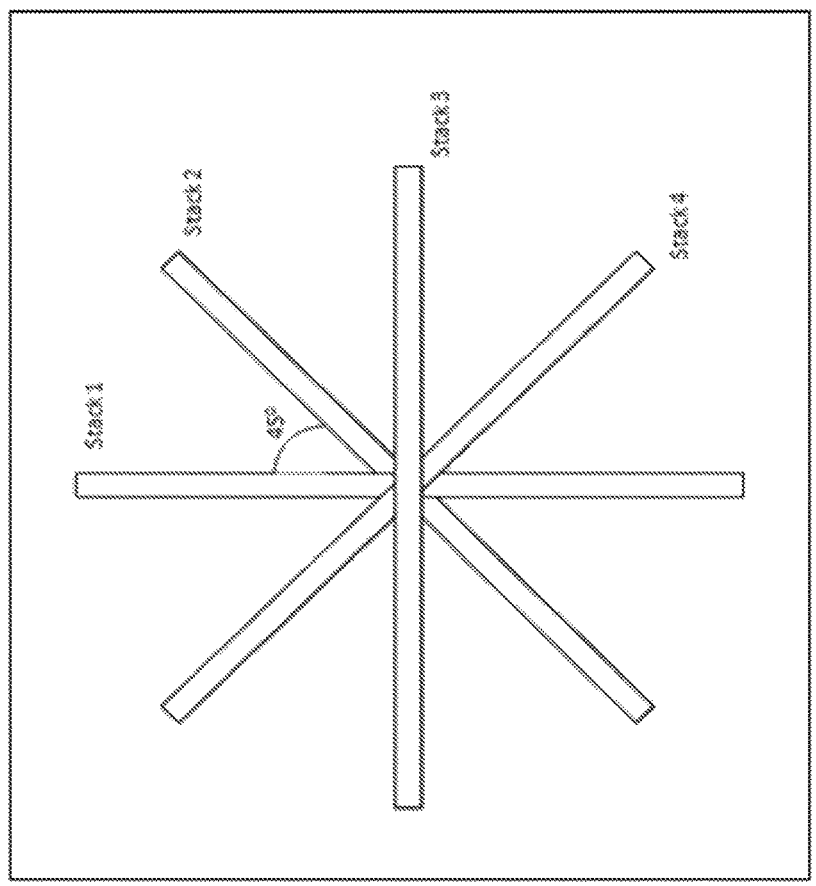
FIG. 12 illustrates an exemplary top view of a Node B antenna arrangement, according to an embodiment of the disclosure.
Figure 13:
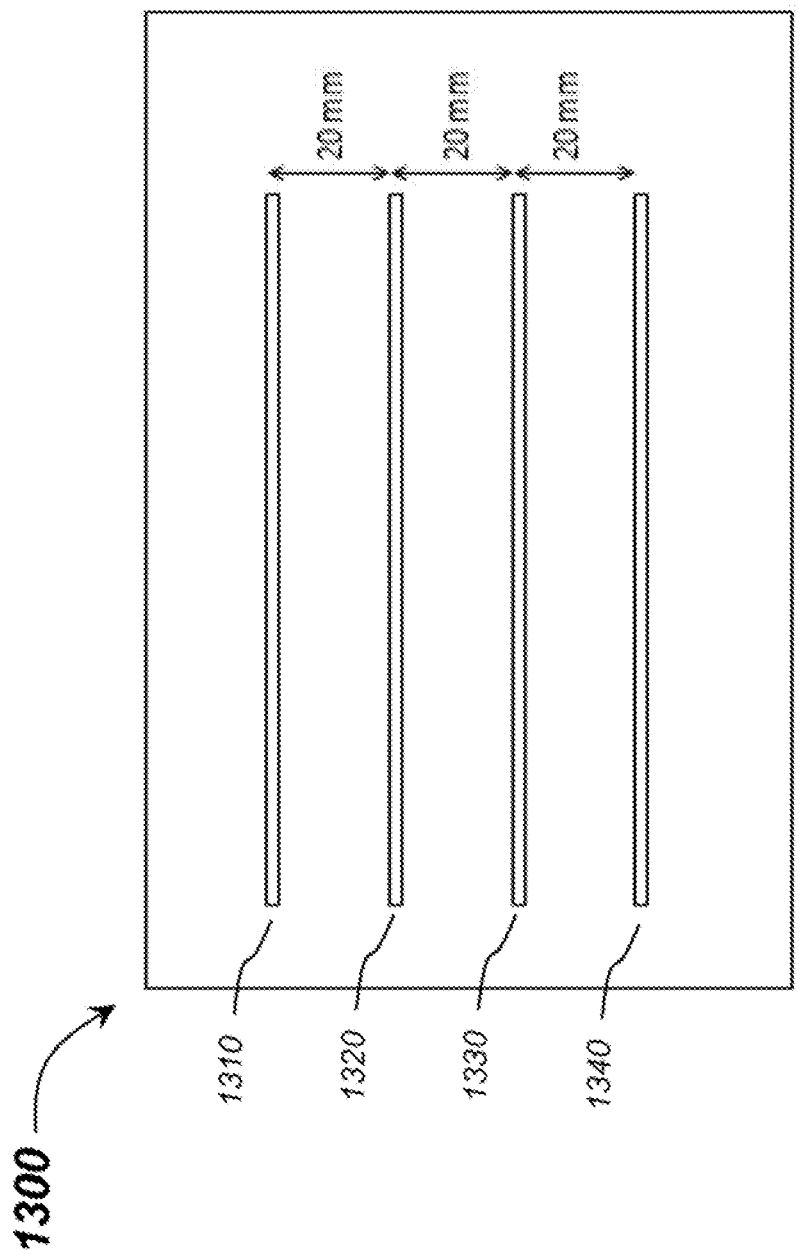
FIG. 13 illustrates an exemplary side view of a Node B antenna arrangement, according to an embodiment of the disclosure.

In some embodiments, four antenna subsets may be stacked in a vertical arrangement one below the other (except for the top one) with an angular separation of 45 degrees at a 20 mm distance apart to create a complete Discrete Directional Antenna Set. FIG. 12 illustrates an exemplary top view 1200 of such an arrangement, showing four antenna subset stacks 1, 2, 3 and 4. FIG. 13 illustrates an exemplary side view 1300 of arrangement of FIG. 12, showing a stack of four antenna subsets 1310, 1320, 1330 and 1340.

Antenna Operation

Antenna Radiation Characteristics

As already described, Node A may have a single antenna. Node B may have a directional discrete multi antenna set (which is a structure arranged in a manner as described above). Considering the above described antenna operation, in some embodiments, the radiation characteristics of Node A and Node B antennas may be designed such that (Receiver) a Node B antenna group (see, for example, FIG. 10) having major lobe in the direction of Node A will always receive maximum power from (Transmitter) Node A.

In some embodiments, Node A and Node B antenna systems may be designed such that they can combat up to 5 multipath fading effect. The radiation characteristics of Node A and Node B antennas may be designed to absorb up to 5 multipath signals, i.e., though there are 5 multipath are present, if Node A is present in major lobe of a particular antenna group of Node B, then it will always receive maximum power from that antenna group in that orientation (direction) rather than any other antenna group.

Cell Sectorization

In some implementations, Node B may implement an engineered procedure/algorithm referred herein as "Cell Sectorization". This procedure may be implemented to improve the accuracy of determining the angular sector of the configured area where Node A can be situated/located at a given instance. The angular width of each sector computed/resolved by Node B may be 45 degrees. The angular width of each sub sector within the sector may be 22.5 degrees.

Node B may compute in which one of these angular sectors Node A would be situated at a given instance with the help of radio frequency radio broadcast signal received from Node A. Subsequently it computes the angular sub sector in which the Node A would be situated at the same given instance. Node B performs Cell Sectorization with respect to itself.

Figure 14:
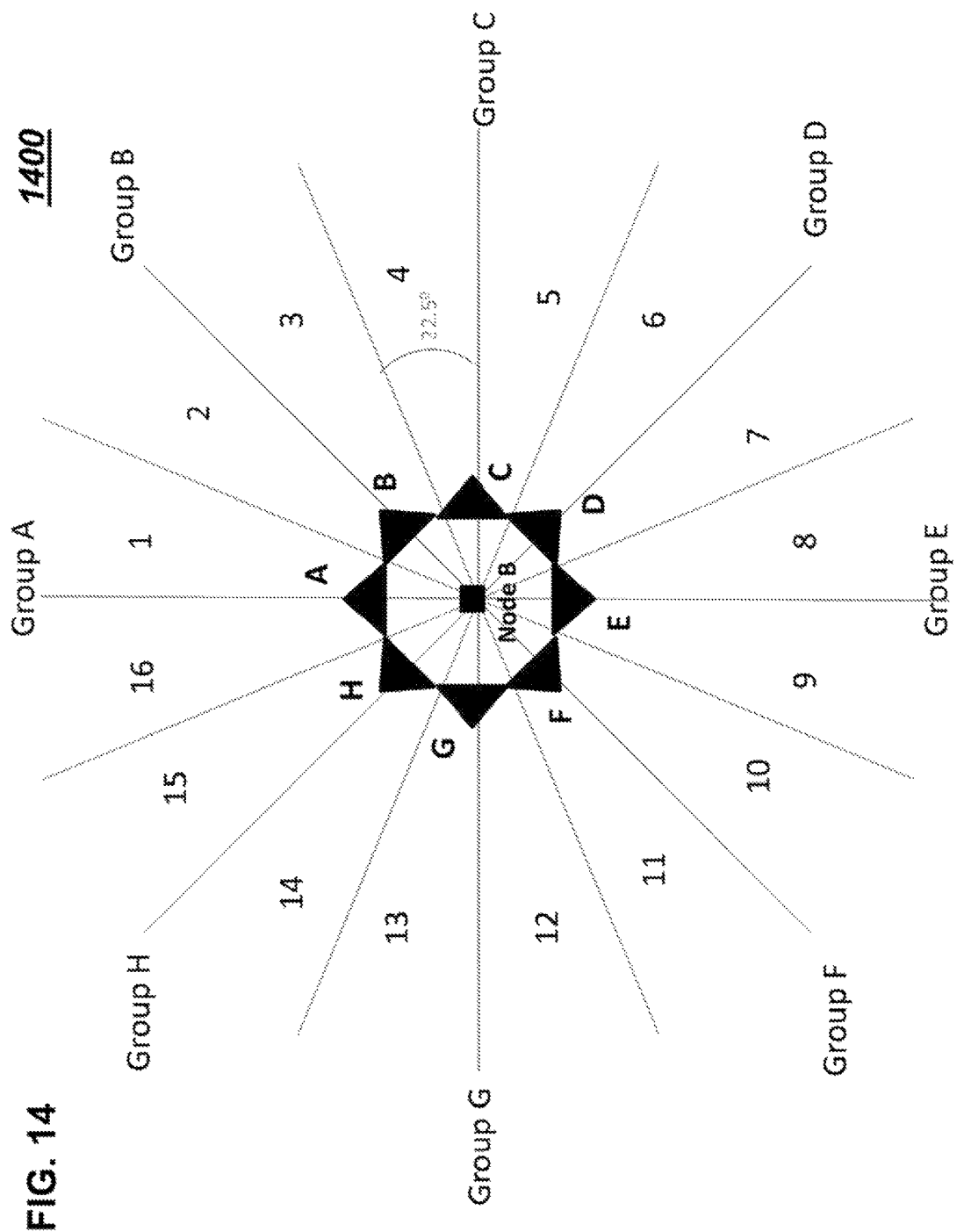
FIG. 14 illustrates an exemplary diagram of angular sectors, according to an embodiment of the disclosure.

Turning to FIG. 14, an exemplary diagram of angular sectors 1400 is illustrated, according to some embodiments of the present disclosure. FIG. 14 depicts the meaning of the angular sectors of a given space, assuming Node B is situated at the center point of a given space (or sectors of space around Node B). As shown, 16 sectors are grouped in to 8 groups. For example, Group A includes sectors 1 and 16, Group B includes sectors 2 and 3, Group C includes sectors 4 and 5, Group D includes sectors 6 and 7, Group E includes sectors 8 and 9, Group F includes sectors 10 and 11, Group G includes sectors 12 and 13, and Group H includes sectors 14 and 15. FIG. 14 also depicts the antenna groups of Node B and angular sectors of a given space. Antenna Group A will receive maximum signal if Node A is in sectors 1 and 16. Similarly for Antenna Group B, it is sectors 2 and 3. For Antenna Group C, it is sectors 4 and 5. For Antenna Group D, it is sectors 6 and 7. For Antenna Group E, it is sectors 8 and 9. For Antenna Group F, it is sectors 10 and 11. For Antenna Group G, it is sectors 12 and 13. For Antenna Group H, it is sectors 14 and 15.

Communication Between Node A and Node B

Figure 15:
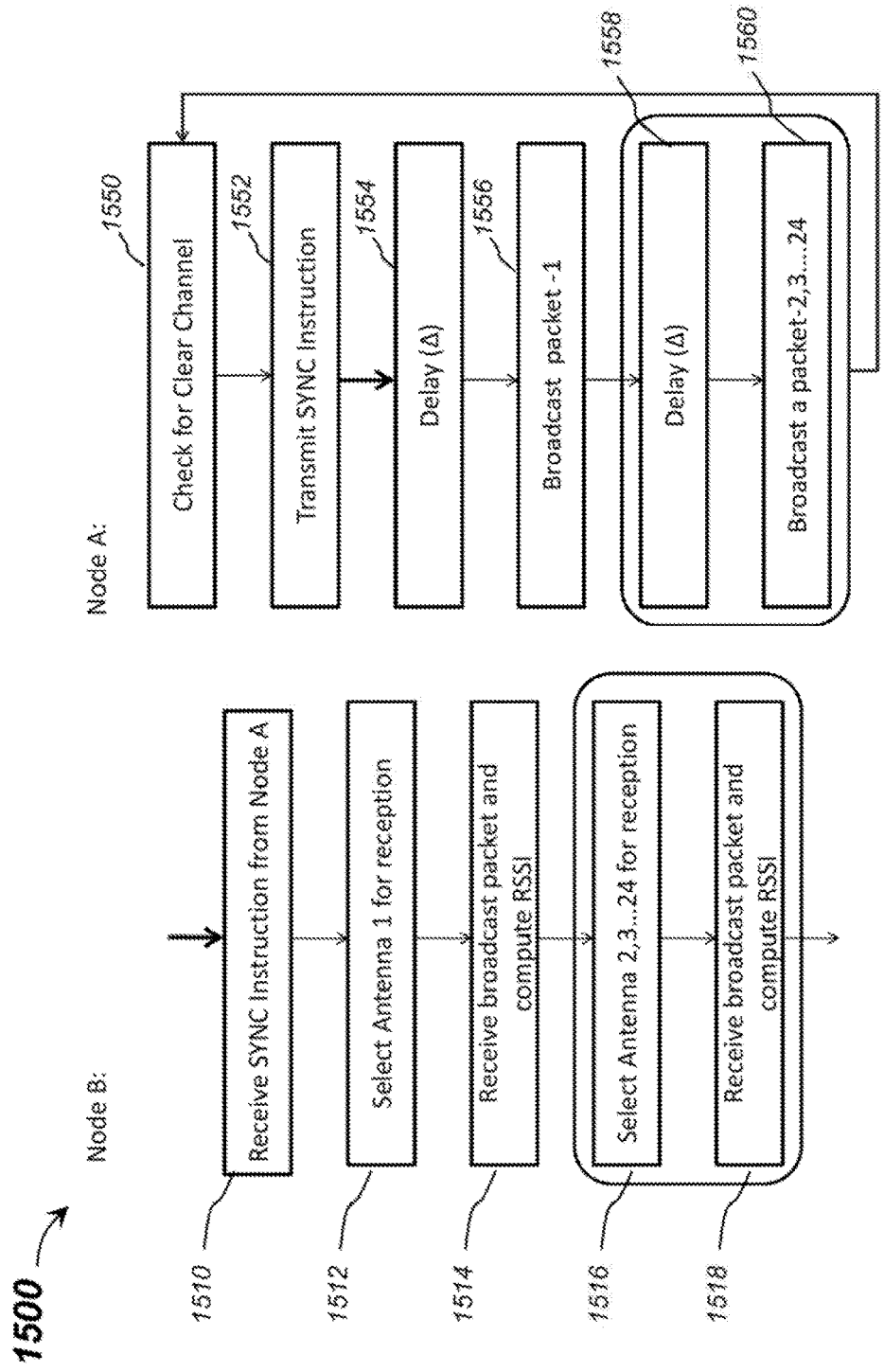
FIG. 15 illustrates an exemplary flow diagram for initiating communication between Node A and Node B, according to an embodiment of the disclosure.

Turning to FIG. 15, an exemplary flow diagram 1500 is illustrated, according to some embodiments of the present disclosure, showing the steps for initiating RF communication between Node A and Node B in order to gather data required for performing "Cell Sectorization" procedure. In some embodiments, this "Cell Sectorization" procedure may be implemented in Node B as a software code/computer program, stored in memory of the Node B device, and executed by the processor in Node B to compute the data gathered by establishing the communication as explained below.

The communication between Node A and Node B as illustrated in FIG. 15 may be initiated by Node A at a preprogrammed interval. Node B (receiver) is always in reception mode. At Step 1550, Node A (Transmitter) may check for channel availability before transmitting a broadcast signal. In some embodiments, to verify channel availability, Node A may follow the standard RF communication method called CCA (clear channel access). At Step 1552, when Node A is sure of availability of a clear channel for RF communication, Node A sends out a SYNC (synchronization) command to Node B. This process ensures that broadcast signals transmission by Node A and antenna switching at Node B are synchronized completely. At Step 1510, Node B receives the SYNC command from Node A, and, at Step 1512, selects a first antenna for receiving signal. At Step 1514, Node B receives (broadcast) signal from Node A (broadcast at Step 1556) and computes a received signal strength indicator (RSSI), which is a measurement of the power present in a received radio signal. Node B computes signal strength of broadcast signal received from Node A with respect to each antenna that is part of its Discrete Directional Antenna Set. As such, Steps 1516 and 1518 are repeated based on the number of antennas used by Node B. In the FIG. 15 illustration, 24 antennas are used in Node B as part of its Discrete Directional Antenna Set. The calculated RSSI, may be stored for each antenna and processed further using the procedure described below.

Cell Sectorization Algorithm Procedure

In some embodiments, the computation algorithm/procedure may divide 360° cell space covered by Node B in 8 sectors of angular width of 45°. Further, each sector may be divided in to two smaller subsectors of angular width of 22.5°. This will lead to a total of 16 sub sectors with an angular width of 22.5°. As shown above, FIG. 14 illustrates an exemplary angular sub sector layout for a given space from the perspective of Node B. It also depicts the antenna groupings and the angular sub sectors associated with each of the antenna group, e.g., antenna group A is associated with angular sub sectors 1 and 16.

Signal Strength Computation for Antenna Groups

Figure 16:
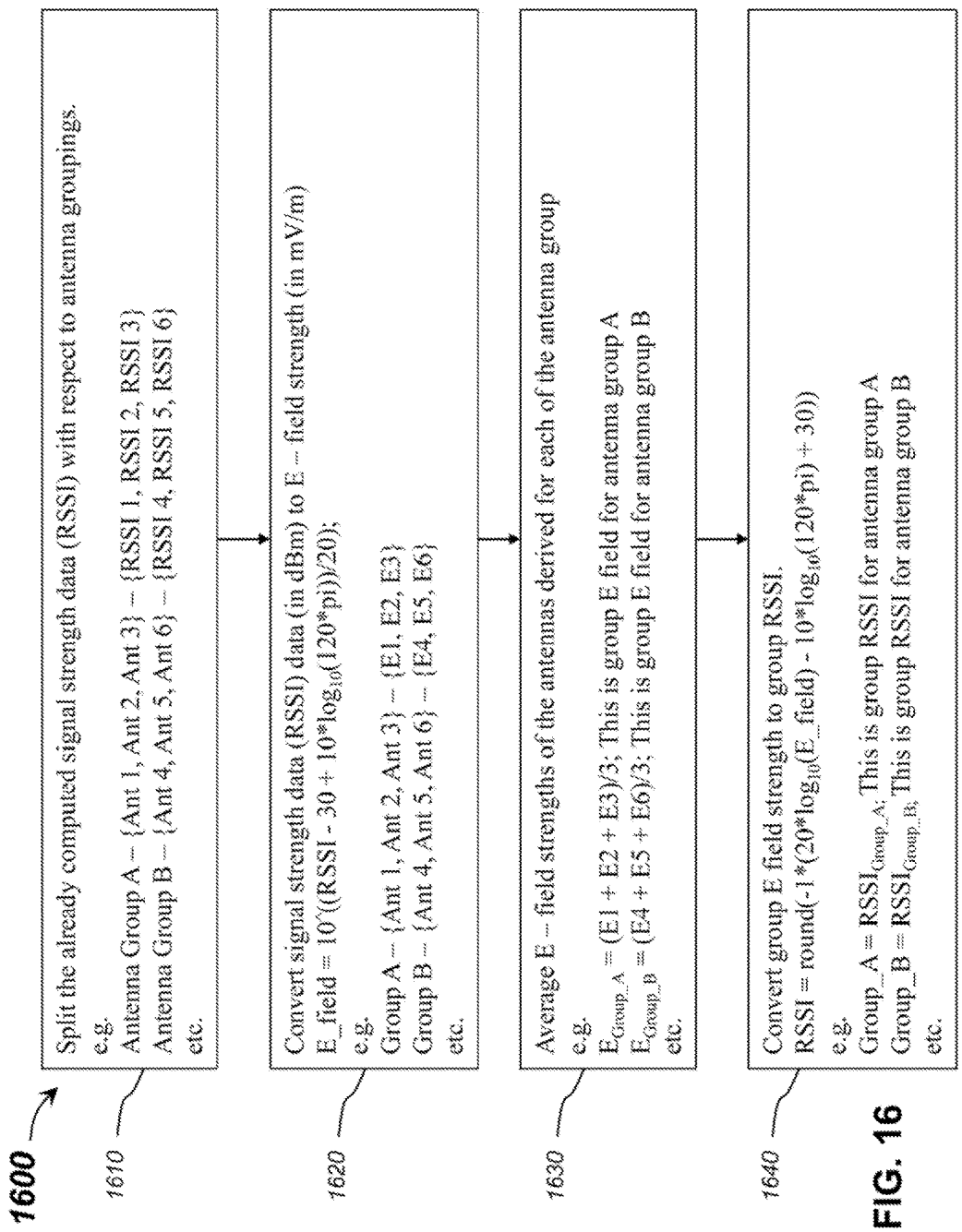
FIG. 16 illustrates an exemplary flow diagram for signal strength computation, according to an embodiment of the disclosure.

Turning to FIG. 16, an exemplary flow diagram 1600 is illustrated, according to some embodiments of the present disclosure, showing the steps for signal strength computation for the antenna groups of Node B. At Step 1610, the already computed signal strength data (RSSI) is split with respect to antenna groupings. At Step 1620, the signal strength data (RSSI) (in dBm) is converted to E-field strength (in mV/m). In some embodiments, E-field is calculated using the formula:

E-field=10^((RSSI−30+10*log$_{10}$(120*pi))/20).

At Step 1630, the E-field strengths of the antennas derived for each of the antenna group is averaged. At Step 1640, group E-field strength is converted to group RSSI. In some embodiments, RSSI is calculated as:

RSSI=round(−1*(20*log$_{10}$(E-field)−10*log$_{10}$(120*pi)+30)).

Computing Angular Sector to Resolution of 45 Degrees

Figure 17:
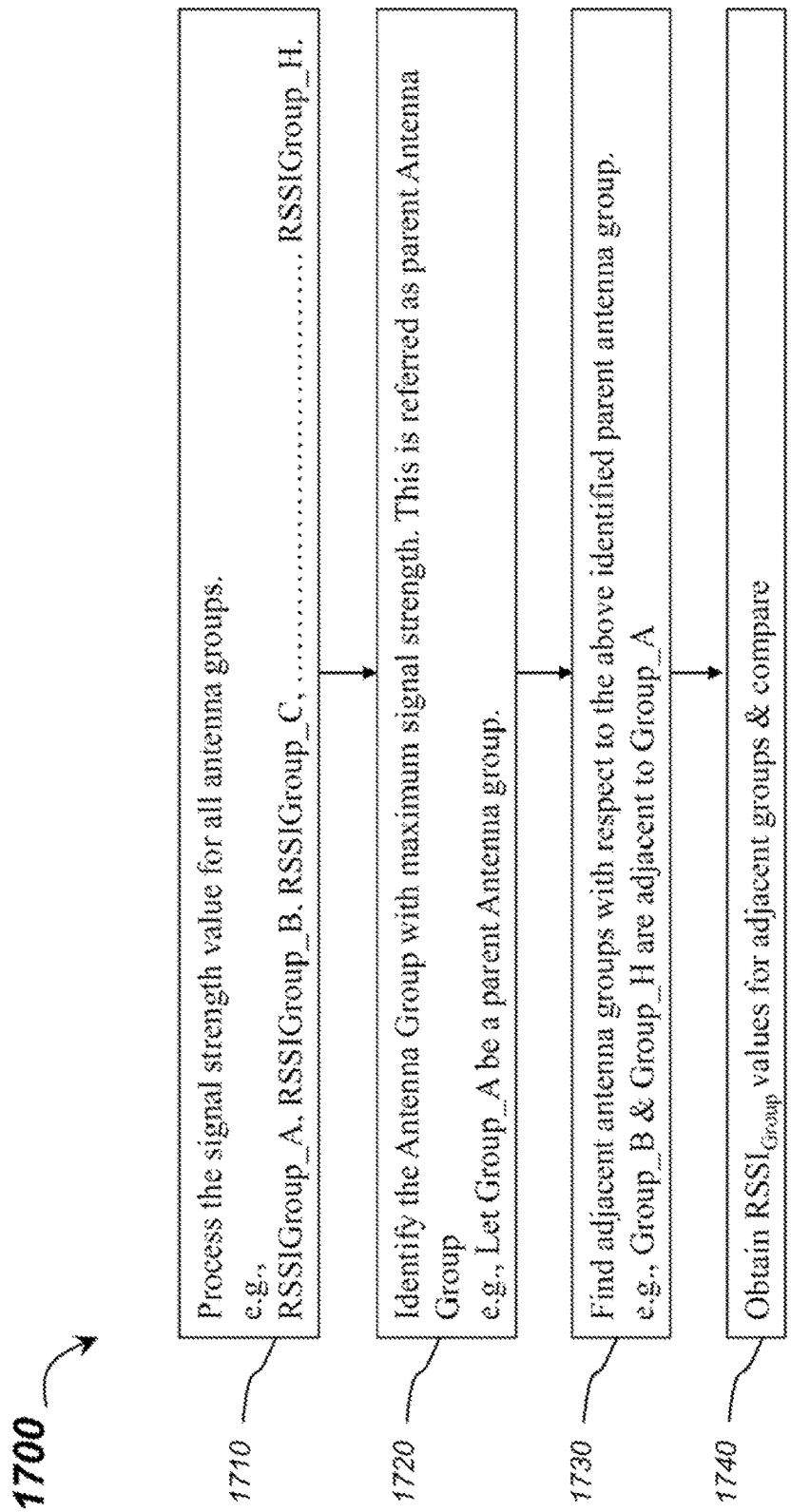
FIG. 17 illustrates an exemplary flow diagram for Node B computation of angular sector to resolution of 45 degrees, according to an embodiment of the disclosure.

Turning to FIG. 17, an exemplary flow diagram 1700 is illustrated, according to some embodiments of the present disclosure, showing Node B computation of angular sector to resolution of 45 degrees. At Step 1710, the signal strength value for all antenna groups is processed. In some embodiments, this step is similarly depicted in Step 1640. At Step 1720, the antenna group with maximum signal strength is identified. This may be referred to as parent antenna group. At Step 1730, adjacent antenna groups with respect to the above identified parent antenna group is determined. At Step 1740, the RSSI$_{Group}$ values for adjacent groups are obtained and compared. In some embodiments, the below look up table may be used for comparison.

| Antenna Group Id | Sector Ids |
|---|---|
| A | 1 & 16 |
| B | 2 & 3 |
| C | 4 & 5 |
| D | 6 & 7 |
| E | 8 & 9 |
| F | 10 & 11 |
| G | 12 & 13 |
| H | 14 & 15 |

Computing Angular Sub Sector to Resolution of 22.5 Degrees

Figure 18:
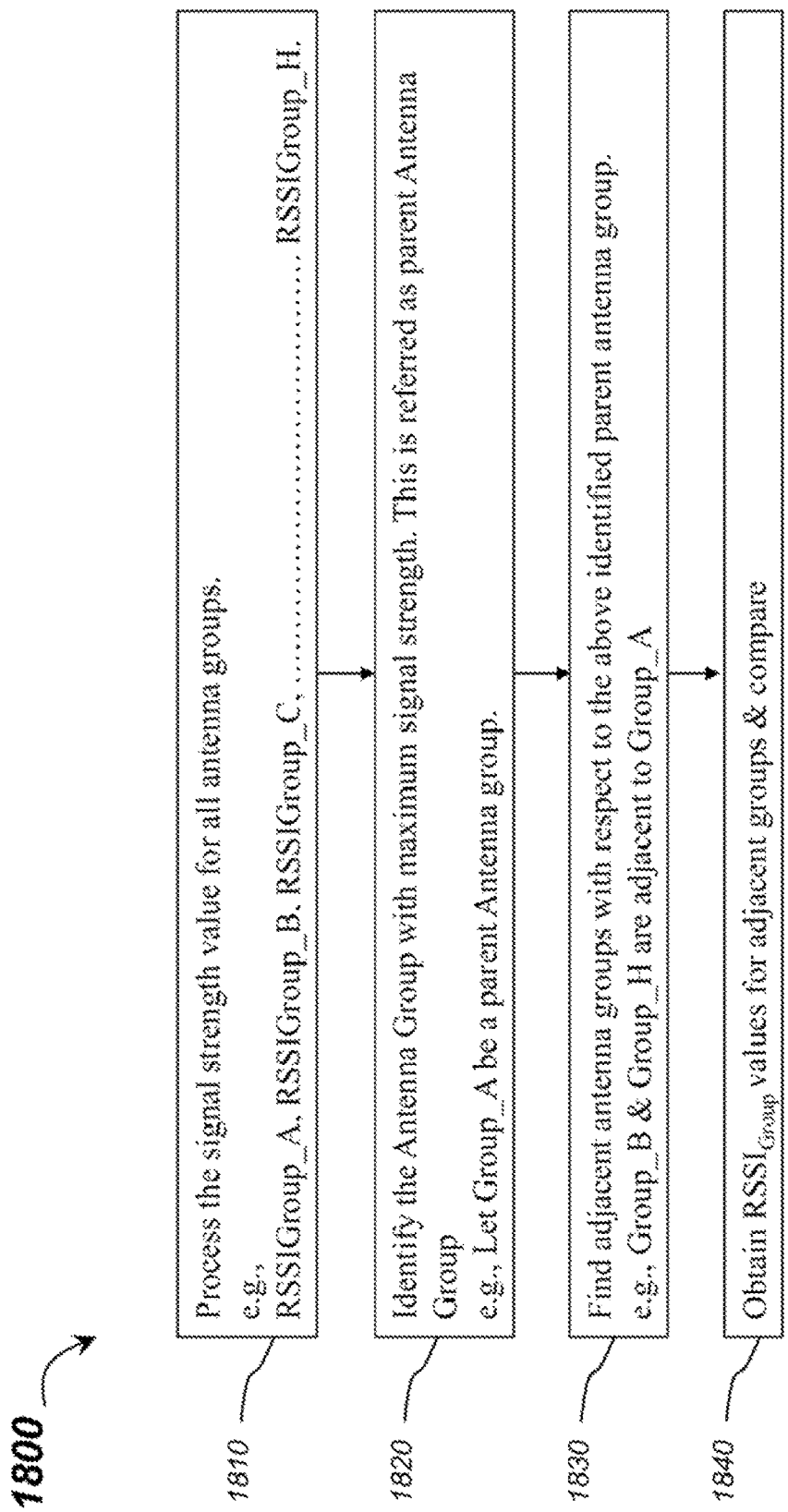
FIG. 18 illustrates an exemplary flow diagram for Node B computation of angular sub sector to resolution of 22.5 degrees, according to an embodiment of the disclosure.

Turning to FIG. 18, an exemplary flow diagram 1800 is illustrated, according to some embodiments of the present disclosure, showing Node B computation of angular sub sector to resolution of 22.5 degrees. At Step 1810, the signal strength value for all antenna groups is processed. At Step 1820, the antenna group with maximum signal strength is identified. This is referred as parent Antenna Group. At Step 1830, adjacent antenna groups with respect to the above identified parent antenna group is determined. At Step 1840, the RSSIGroup values for adjacent groups are obtained and compared. In some embodiments, the below look up table may be used for comparison.

| Max Signal Strength Antenna Group Id | Signal strength (Group X > Group Y) | Sector Id |
|---|---|---|
| A | RSSI$_{Group\_B}$ > RSSI$_{Group\_H}$ | 1 |
| A | RSSI$_{Group\_H}$ > RSSI$_{Group\_B}$ | 16 |
| B | RSSI$_{Group\_A}$ > RSSI$_{Group\_C}$ | 2 |
| B | RSSI$_{Group\_C}$ > RSSI$_{Group\_A}$ | 3 |
| C | RSSI$_{Group\_B}$ > RSSI$_{Group\_D}$ | 4 |
| C | RSSI$_{Group\_D}$ > RSSI$_{Group\_B}$ | 5 |
| D | RSSI$_{Group\_C}$ > RSSI$_{Group\_E}$ | 6 |
| D | RSSI$_{Group\_E}$ > RSSI$_{Group\_C}$ | 7 |
| E | RSSI$_{Group\_D}$ > RSSI$_{Group\_F}$ | 8 |
| E | RSSI$_{Group\_F}$ > RSSI$_{Group\_D}$ | 9 |
| F | RSSI$_{Group\_E}$ > RSSI$_{Group\_G}$ | 10 |
| F | RSSI$_{Group\_G}$ > RSSI$_{Group\_E}$ | 11 |
| G | RSSI$_{Group\_F}$ > RSSI$_{Group\_H}$ | 12 |
| G | RSSI$_{Group\_H}$ > RSSI$_{Group\_F}$ | 13 |
| H | RSSI$_{Group\_G}$ > RSSI$_{Group\_A}$ | 14 |
| H | RSSI$_{Group\_A}$ > RSSI$_{Group\_G}$ | 15 |

Cell Sector Overlap Algorithm

Figure 19A:
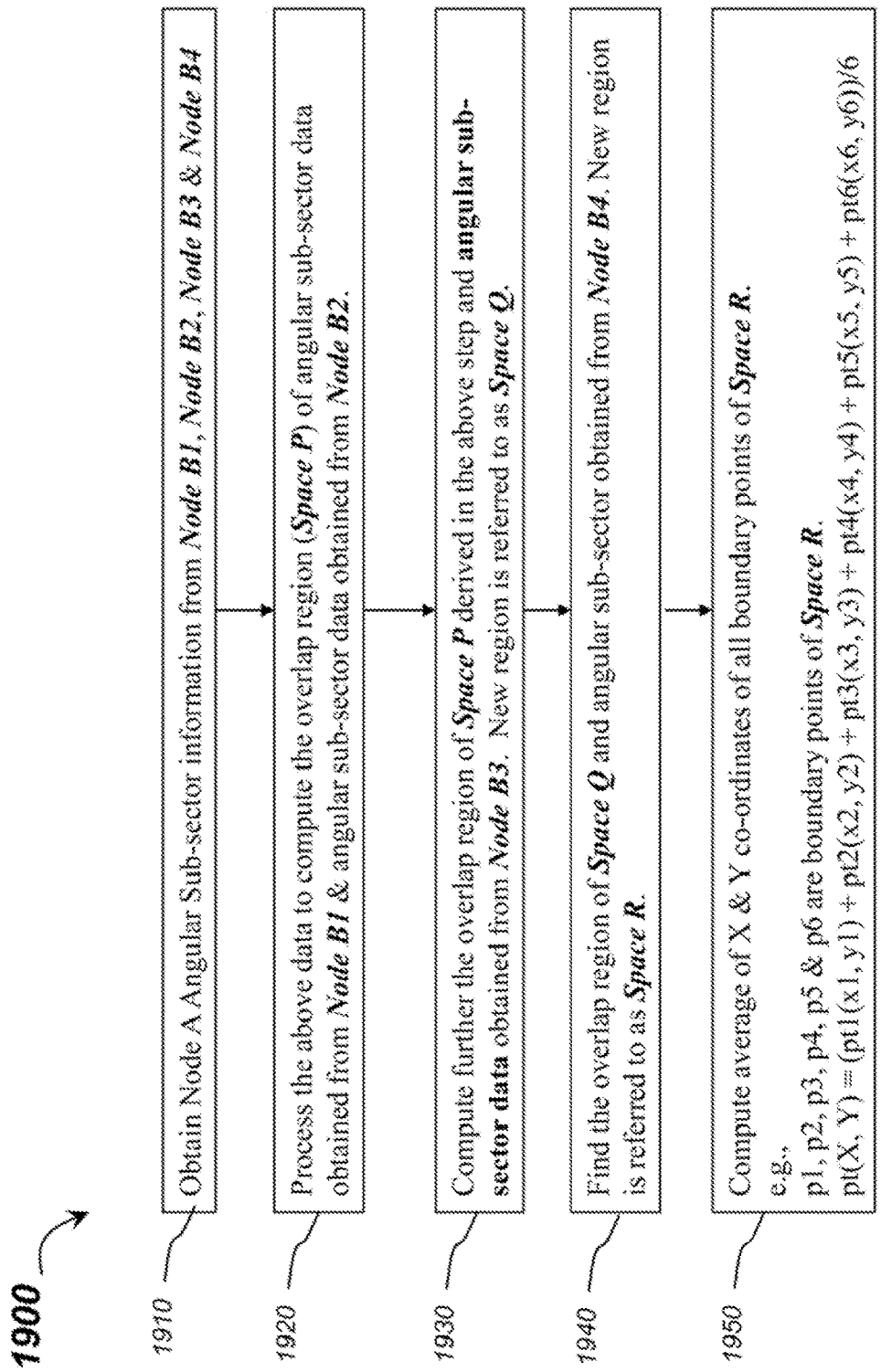
FIGS. 19A-19E illustrate exemplary flow diagram for computation of cell sector overlap algorithm in Node C, according to an embodiment of the disclosure.
Figure 19B:
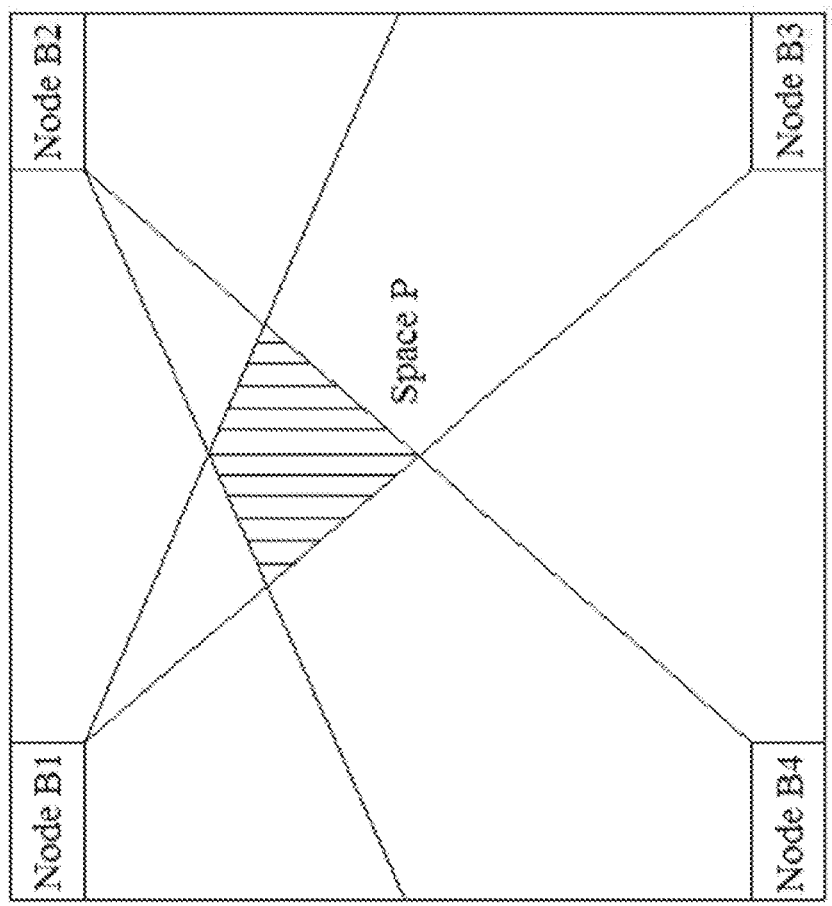
Figure 19C:
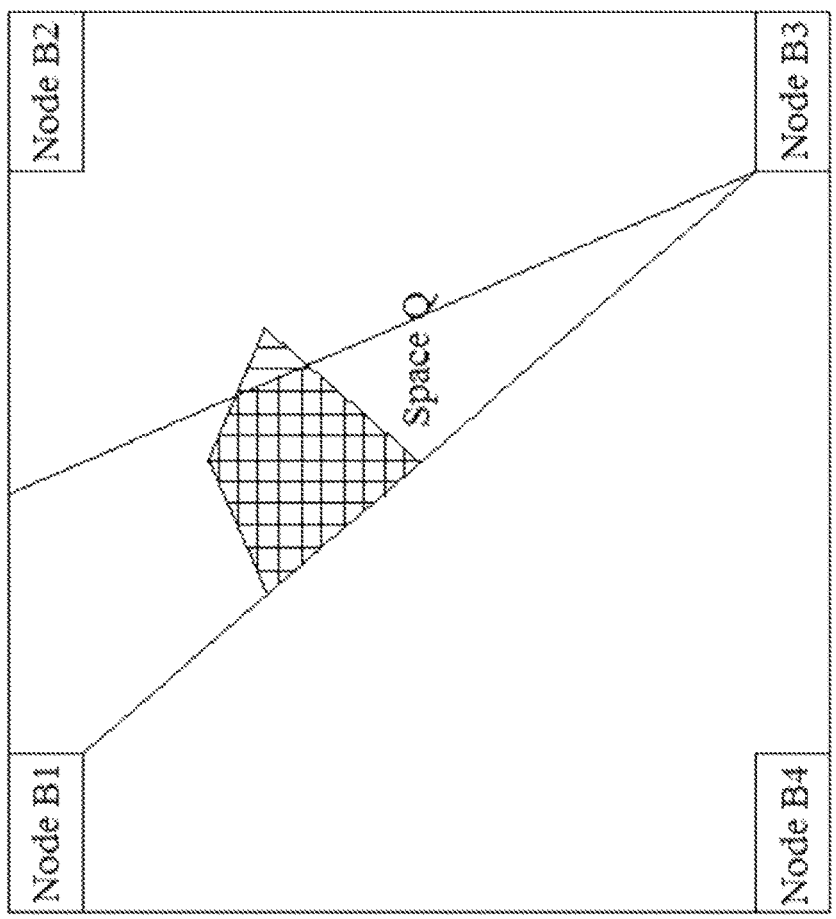
Figure 19D:
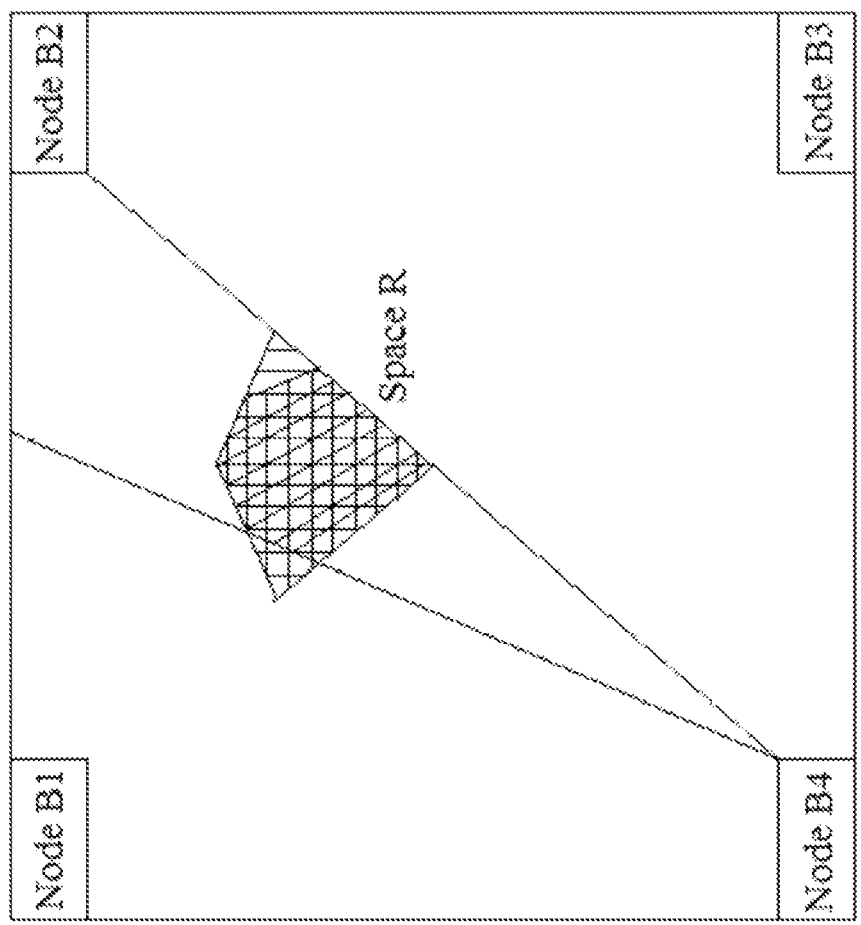
Figure 19E:
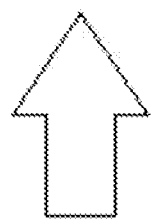
Figure 19E:
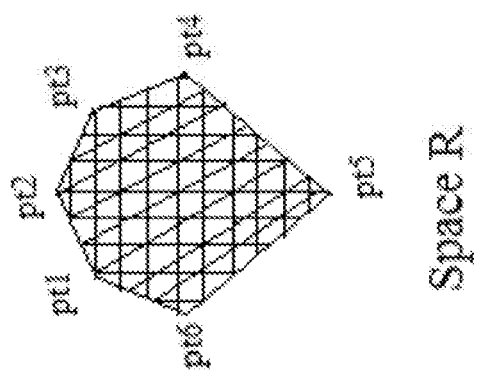

Turning to FIGS. 19A-19E, an exemplary flow diagram 1900 is illustrated, according to some embodiments of the present disclosure, showing computation of cell sector overlap algorithm in Node C to determine the location/position of Node A in a configured area. In some embodiments, the cell sector overlap algorithm may be stored as a computer program in the memory of Node C. In this example, Node C is a RF node which works as an aggregator collecting computed data using cell sectorization algorithm/procedure from logical Node B, for example, Nodes B1, B2, B3 and B4, as shown in FIGS. 19B-19D.

At Step 1910, Node C may obtain Node A angular sub-sector information from Node B1, Node B2, Node B3 and Node B4 (as described in FIGS. 14-18). At Step 1920, the information is processed to determine the overlap region (referred to as Space P, see also FIG. 19B) of angular sub-sector data obtained from Node B1 and angular sub-sector data obtained from Node B2. At Step 1930, the overlap region of Space P derived in the above step and angular sub-sector data obtained from Node B3 is determined. The new region is referred to as Space Q, see also FIG. 19C. At Step 1940, the overlap region of Space Q and angular sub-sector obtained from Node B4 is determined. The new region is referred to as Space R, see also FIG. 19D. At Step 1950, Node C determines the average of X and Y co-ordinates of all boundary points of Space R, see also FIG. 19E. In some embodiments, the average may be determined using the formula:

$$pt(X,Y)=(pt1(x1,y1)+pt2(x2,y2)+pt3(x3,y3)+pt4(x4,y4)+pt5(x5,y5)+pt6(x6,y6))/6,$$

where pt1, pt2, pt3, pt4, pt5 and pt6 are boundary points of Space R.

The above steps provide the X and Y co-ordinates of the location/position of the Node A in a given space. Node C may communicate this information to other computing devices using a network communication interface for further processing.

The system arrangement depicted in FIG. 1 may be repeated to provide coverage for a larger space that is bigger than the size that can be covered by the above said arrangement.

Those of skill in the art will understand that the systems and methods described herein may utilize a computing device, such as a computing device, to perform the steps described above, and to store the results in memory or storage devices, or be embodied as an integrated circuit or digital signal processor. Those of skill in the art will also understand that the steps disclosed herein can comprise instructions stored in memory of the computing device, and that the instructions, when executed by the one or more processors of the computing device, can cause the one or more processors to perform the steps disclosed herein.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "include" means "including, but not limited to," or "include, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

It should be noted that where a discrete value or range of values is set forth herein (e.g., 2, 4, 24, etc.), it is noted that the value or range of values may be claimed more broadly than as a discrete number or range of numbers, unless indicated otherwise. Any discrete values mentioned herein are merely provided as examples.

What is claimed is:

1. A system for determining a spatial location of a target radio frequency node of a first type located in a defined space, the system comprising:
   a plurality of radio frequency nodes of a second type located within the defined space, wherein each of the plurality of radio frequency nodes of the second type communicates with the target radio frequency node, each of the plurality of radio frequency nodes of the second type comprises a multi-antenna system and an antenna switch controlling the operational status of antennas of the multi-antenna system, and wherein the multi-antenna system comprises discrete directional antenna elements having 24 discrete antennas segregated in eight distinct groups with three antennas in each group, the antennas within each group arranged in an adjacent fashion; and a radio frequency node of a third type located within or outside the defined space, wherein the radio frequency node of the third type communicates with the plurality of radio frequency nodes of the second type to determine the spatial location of the target radio frequency node.

2. The system of claim 1, wherein the target radio frequency node comprises an omni-directional antenna.

3. The system of claim 2, wherein the omni-directional antenna has a bandwidth of 80 MHz.

4. The system of claim 1, wherein the target radio frequency node transmits signals at a programmable interval and in the 2.4 GHz to 2.48 GHz band.

5. The system of claim 1, wherein each four discrete antennas of the multi-antenna system are further stacked in a vertical arrangement.

6. The system of claim 1, wherein the discrete antennas of the multi-antenna system are further arranged in sectors having an angular separation of 45 degrees at a 20 mm distance apart to create a discrete directional antenna set.

7. The system of claim 6, wherein each sector comprises two sub-sectors, each having an angular width of 22.5 degrees.

8. The system of claim 7, wherein each antenna of the multi-antenna system provides radio radiation coverage in a specific direction and a predetermined angular sector of the defined space.

9. The system of claim 8, wherein the spatial location of the target radio frequency node is determined, by the radio frequency node of the third type, from angular sub-sector data obtained from the plurality of radio frequency nodes of the second type.

10. The system of claim 1, wherein the plurality of radio frequency nodes of the second type are located at the periphery of the defined space.

11. A method for determining a spatial location of a target radio frequency node of a first type located in a defined space, the method comprising:

broadcasting, by the target radio frequency node, radio frequency signals;

receiving, by a plurality of radio frequency nodes of a second type located within the defined space, the broadcast signals from the target radio frequency node, wherein each of the plurality of radio frequency nodes of the second type comprises a multi-antenna system and an antenna switch controlling the operational status of antennas of the multi-antenna system, and wherein the antennas of the multi-antenna system are arranged in sectors having an angular separation of 45 degrees at a 20 mm distance apart to create a discrete directional antenna set, and sub-sectors of angular width of 22.5 degrees, each antenna of the multi-antenna system provides radio radiation coverage in a specific direction and in a predetermined angular sector of the defined space;

transmitting, by the plurality of radio frequency nodes of the second type, information data based on signals from the target radio frequency node;

receiving, by a radio frequency node of a third type located within or outside the defined space, the information data transmitted from the plurality of radio frequency nodes of the second type; and determining, by the radio frequency node of the third type, the spatial location of the target radio frequency node based on angular sub-sector data received from the plurality of radio frequency nodes of the second type.

12. The method of claim 11, wherein the target radio frequency node comprises an omni-directional antenna.

13. The method of claim 12, wherein the omni-directional antenna of the target radio frequency node and the multi-antenna system of the plurality of radio frequency nodes of the second type absorb up to 5 multipath signals.

* * * * *